UNITED STATES PATENT OFFICE.

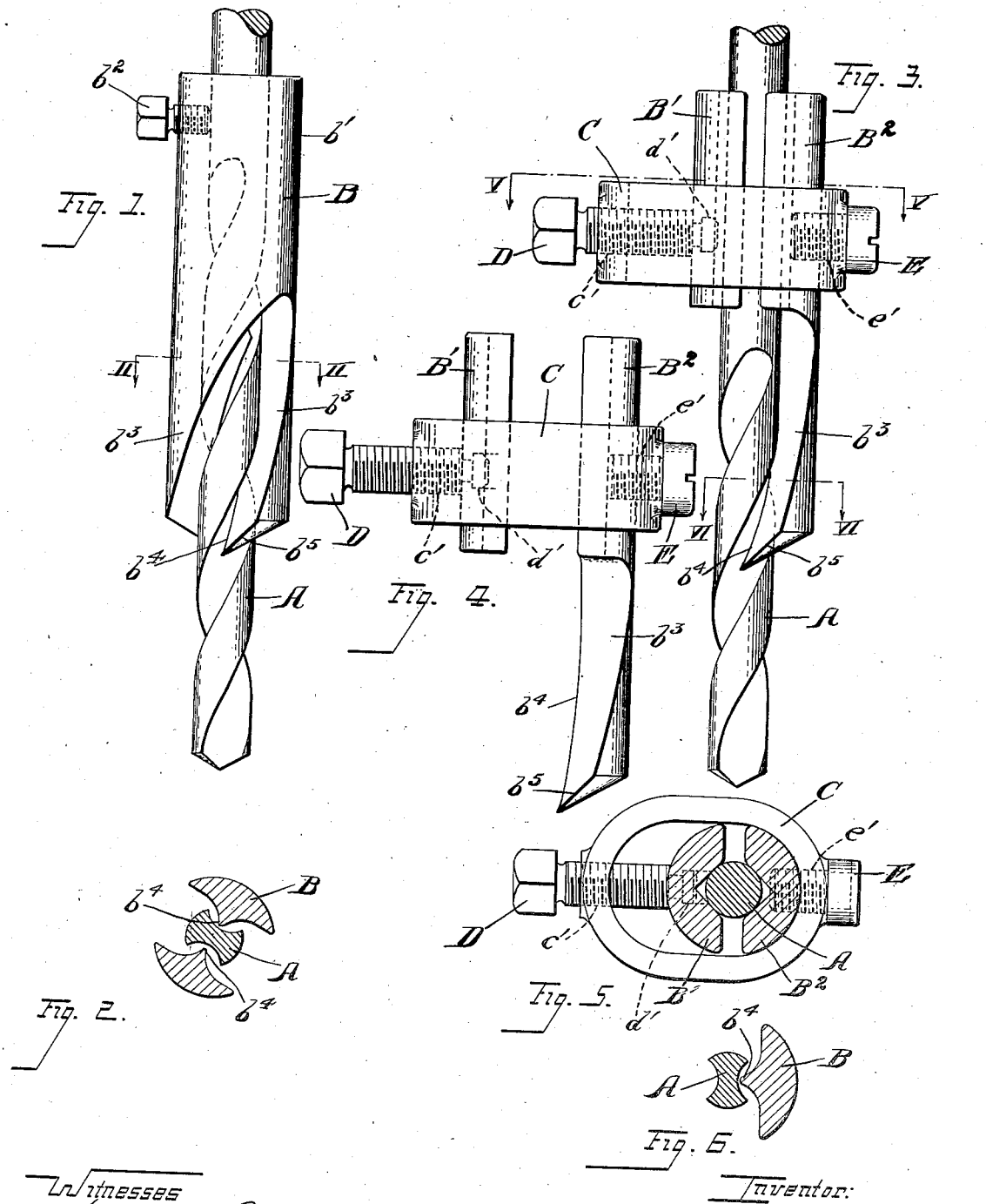

WILLIAM H. SEMON, OF CLEVELAND, OHIO.

COMBINED DRILL AND COUNTERSINK.

1,111,410.　　Specification of Letters Patent.　Patented Sept. 22, 1914.

Application filed May 11, 1911. Serial No. 626,635.

*To all whom it may concern:*

Be it known that I, WILLIAM H. SEMON, a citizen of the United States, resident of Cleveland, county of Cuyahoga, and State of Ohio, have invented a new and useful Improvement in Combined Drills and Countersinks, of which the following is a specification, the principle of the invention being herein explained and the best mode in which I have contemplated applying that principle, so as to distinguish it from other inventions.

My invention relates to a combined drill and countersink, and more particularly to a specialized improvement associated with the different parts of the latter.

The object is to provide a countersink drill for use in connection with standard twist drills which while fulfilling the demands alike for simplicity and economy of construction will nevertheless prove more efficient.

The said invention consists of means which are hereinafter fully described and particularly set forth in the claims.

The annexed drawings and the following description set forth in detail certain means embodying my invention, the disclosed means, however, constituting but one of various mechanical forms in which the principle of my invention may be applied.

In said annexed drawings:—Figure 1 represents a combined drill and countersink of the simplest form embodying my invention. Fig. 2 is a section on line II—II of Fig. 1, looking in the direction of the arrows. Fig. 3 represents an adjustable form of drill and countersink in accordance with the principle of the invention. Fig. 4 is a detail view of parts thereof in different relative positions. Fig. 5 is a section on line V—V of Fig. 3 looking in the direction of the arrows. Fig. 6 is a section on line VI—VI of Fig. 3, looking in the direction of the arrows.

Referring first to Fig. 1, in which a twist drill A is shown surrounded by one form of my improved countersink drill: This latter, B, comprises a cylindrical shank portion, $b'$ provided with a cylindrical opening corresponding precisely in size to the diameter of the drill A which it is adapted to receive. A set-screw $b^2$ is provided for the purpose of fixing the drill and socket to each other. The lower portion of the countersink B is provided with one or more cutting members proper $b^3$, each of which, in accordance with the invention, is provided with an inwardly curved inside edge $b^4$, the extremity of which forms an inwardly twisted lip $b^5$, conforming exactly, and preferably immediately adjacent or actually contiguous, to the central or bottom portion of the grooves as seen in Fig. 6. This positively insures the inside or actual cutting edges of the countersink being inside the diameter of the hole which is being drilled by the primary drill, and hence necessarily inside the diameter of the hole in the shank $b'$ of the countersink. Moreover, this inner edge of each of the cutting members should have the same degree of twist as the fluting of the primary drill with which it is adapted to be used. The inner edge may also follow the groove of the primary drill for the greatest distance that is practicable, in order that the countersink as a whole may have its cutting edge considerably worn down by grinding without precluding the continued usage thereof.

As shown in the drawing the general cross section of each connecting member is triangular. This leaves a space bounded by the connecting member and by the surface of the flute which permits the shavings to pass upwardly and be guided away from the said members $b^3$. In the adjustable form shown in Figs. 3 to 6 inclusive, the shank of the countersink drill is divided into two separable parts B' and B². The inner faces of these divisions of the shank, or those surfaces which actually engage the surface of the primary drill are V-shaped, in order to insure proper centering and alinement of the drill and countersink with respect to each other. An adjusting band C surrounds the divisions of the shank B' and B², and is provided adjacent the division B² with a screw-threaded opening $c'$. A set-screw D is adapted to screw-thread through this opening $c'$, and on its inner extremity has a swivel end $d'$ loosely mounted in the member B². Through the opposite side of the band C and specifically through the correspondingly screw-threaded opening $e'$ a set-screw E is adapted to extend for the purpose of fixing the member B' and its attached cutting member $b^3$. Accordingly, as will be manifest, the manipulation of the set-screw D will serve to clamp the two divisions B' and B² of the shank about the shank of the drill A, and hence compose an adjustable shank for countersink drills, as will be readily understood.

Either one or all of the possible divisions of the shank in this adjustable form may be provided with such a cutting member $b^3$ having an edge $b^4$ and cutting lip $b^5$. This edge is likewise designed so that it fits into and follows for any chosen distance one of the grooves of the primary drill. Since, after the manner of its conjunctive use as previously explained in connection with Fig. 1, the inside edge of the countersink cutting member fits into and conforms in curvature with the groove of the primary drill, a clean cut is absolutely guaranteed the instant this cutting lip of the countersink comes in contact with the edge of the hole already drilled by the primary drill. Furthermore, since the inside edge of this cutting member fits into and follows for any desired distance a groove on the primary drill, the countersink may be sharpened again and again after the edge on the lip has worn down, before impairing any of the originally intended functions, and then by reason of its being removably associated with the shank may be readily replaced, when this finally becomes necessary.

As shown in the drawings the lower or cutting portion of the members $b^3$ is of like cross-section throughout so that as the drill is shortened by sharpening, the conformation of the lower end is not changed and the successive cutting edges formed by such sharpening always occupy the same position relative to the axis of the drill.

Having fully described my invention, what I claim and desire to secure by Letters Patent is:

1. A combined drill and countersink comprising the combination with a drill having a flute; of a countersink-member secured thereto and provided with a transverse cutting edge; the inner longitudinal portion of said member lying within and corresponding in curvature with the curvature of said flute; said countersink-member having its cutting end constructed so as to have a material portion of the length thereof of like cross-sectional area throughout, successive cross-sections having a similar relation to the axis of the drill.

2. In combination, a drill and an outer countersink-member having two converging inner surfaces ending substantially in a line conforming in curvature with and extending into the flute of the drill; the said countersink-member furthermore being formed with a cutting edge with its extremity extending transversely with respect to said inner curved line and joining the lower extremity thereof.

Signed by me, this 9th day of May, 1911.

W. H. SEMON.

Attested by—
 CURT B. MUELLER,
 WINFRED WALTZ.